United States Patent
Schlueter

(10) Patent No.: US 10,446,377 B2
(45) Date of Patent: Oct. 15, 2019

(54) CONTROL OF GAS FLOW

(71) Applicant: Thermo Fisher Scientific (Bremen) GmbH, Bremen (DE)

(72) Inventor: Hans-Juergen Schlueter, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 8 days.

(21) Appl. No.: 15/210,507

(22) Filed: Jul. 14, 2016

(65) Prior Publication Data

US 2017/0018416 A1 Jan. 19, 2017

(30) Foreign Application Priority Data

Jul. 14, 2015 (GB) .................................. 1512245.0

(51) Int. Cl.
*H01J 49/00* (2006.01)
*G05D 7/01* (2006.01)
*H01J 49/10* (2006.01)

(52) U.S. Cl.
CPC .......... *H01J 49/005* (2013.01); *G05D 7/0186* (2013.01); *H01J 49/105* (2013.01)

(58) Field of Classification Search
None
See application file for complete search history.

(56) References Cited

U.S. PATENT DOCUMENTS

| 3,763,877 A | 10/1973 | Lieb | |
|---|---|---|---|
| 6,335,202 B1* | 1/2002 | Lee | G01N 15/0826 422/68.1 |
| 8,156,788 B2* | 4/2012 | Shaimi | B01D 15/1864 73/23.36 |
| 2006/0038121 A1* | 2/2006 | Guevremont | G01N 27/624 250/290 |
| 2006/0211056 A1* | 9/2006 | Dellagi | C07K 14/44 435/7.22 |
| 2006/0217903 A1 | 9/2006 | Shajii et al. | |
| 2006/0251545 A1* | 11/2006 | Billingham | G01N 33/0022 422/110 |
| 2011/0210241 A1* | 9/2011 | Badiei | G05D 7/0635 250/282 |
| 2012/0156101 A1* | 6/2012 | Kreft | G01N 35/00 422/83 |
| 2013/0134306 A1* | 5/2013 | Nakano | H01J 49/005 250/289 |
| 2016/0145265 A1* | 5/2016 | Kopetzki | C07D 493/18 549/348 |

FOREIGN PATENT DOCUMENTS

| CN | 101160508 A | 4/2008 |
|---|---|---|
| CN | 203405748 U | 1/2014 |
| CN | 104299666 A | 1/2015 |

(Continued)

*Primary Examiner* — Andrew Smyth

(74) *Attorney, Agent, or Firm* — David A. Schell

(57) ABSTRACT

The invention relates to a gas inlet system for providing gas into an analytical apparatus, comprising at least a first and a second flow restriction that are arranged on a gas inlet line, a gas flow control line connected to the gas inlet line, a gas flow controller on the gas control line, and valves for controlling gas flow in the gas inlet line and the gas control line. Also provided is a method of controlling gas flow into an analytical apparatus.

31 Claims, 8 Drawing Sheets

(56) References Cited

FOREIGN PATENT DOCUMENTS

| | | | | |
|---|---|---|---|---|
| GB | 1378037 | A | * 12/1974 | ............ G01N 21/766 |
| GB | 1378037 | A | * 12/1974 | ............ G01N 21/766 |
| JP | 60231161 | A | * 11/1985 | ......... G01N 30/7213 |
| JP | 60231161 | A | * 11/1985 | ......... G01N 30/7213 |
| JP | 61-099857 | A | 5/1986 | |
| JP | 63-156069 | U1 | 10/1988 | |
| JP | 02-120661 | A | 5/1990 | |
| JP | 2001-116724 | A | 4/2001 | |
| WO | 2011/075417 | A1 | 6/2011 | |

* cited by examiner

CONTROL OF GAS FLOW

FIELD

The invention relates to a gas inlet system for analyzers, including analysers that operate under vacuum. The invention furthermore relates to a method for delivering a stream of gas to analyzers.

BACKGROUND

Inductively coupled plasma mass spectrometry (ICP-MS) is an analytical method that is capable of detecting metals and certain non-metals at concentrations at very low concentration, as low as one part in $10^{15}$ (part per quadrillion, ppq) on non-interfered low-background isotopes. The method involves ionizing the sample to be analyzed with an inductively coupled plasma and then using a mass spectrometer to separate and quantify the thus generated ions.

The plasma is generated by ionizing a gas, usually argon, in an electromagnetic coil, to generate a highly energized mixture of argon atoms, free electrons and argon ions.

Certain elements are known to have relatively poor detection limits by ICP-MS. These are predominantly those that suffer from spectral interferences generated by ions that are derived from the plasma gas, matrix components or the solvent used to solubilize samples. Examples include $^{40}Ar^{16}O$ for determination of $^{56}Fe$, $^{38}ArH$ for determination of $^{39}K$, $^{40}Ar$ for determination of $^{40}Ca$, $^{40}Ar^{40}Ar$ for determination of $^{80}Se$, $^{40}Ar^{35}Cl$ for determination of $^{75}As$, $^{40}Ar^{12}C$ for determination of $^{52}Cr$ and $^{35}Cl^{16}O$ for determination of $^{51}V$.

One solution to this problem is provided by collision cell technology (ICP-CCT), that includes a collision/reaction cell that is positioned before the analyser. Into this cell, which typically comprises a multipole operating in a radiofrequency mode to focus the ions, a collision gas such as helium or hydrogen is introduced. The collision gas collides and reacts with the ions in the cell, to convert interfering ions to harmless non-interfering species or other ions that do not cause interference.

Due to the range of interfering species that may be present, it may be advantageous to use more than one collision gas. This usually means bleeding one type of gas into the collision cell, collect data thus obtained, and subsequently switch to another collision gas. The flow of collision gas is usually in the range of about 0.2 to 10 mL/min, and is typically controlled by a mass flow controller.

In principle, it would be advantageous to use a single mass flow controller to control the flow of different types of collision gas being used. However, due to the large dead volume of mass flow controllers, a gas flush of more than 10 minutes is required before data can be collected. Therefore, in current systems a separate mass flow controller is used for each collision gas being used. Since mass flow controllers are fairly expensive, this leads to significant added cost of each instrument.

It would be desirable to provide a gas control system that only required a single flow controller for controlling flow of multiple types of collision gas in an ICP-CCT instrument. Such a system should ideally allow rapid switching of gas in a simple, cost-effective manner.

SUMMARY

In accordance with a first aspect of the invention, there is provided a gas inlet system for providing gas into an analytical apparatus, the system comprising (a) at least one gas inlet line fluidly connected to the apparatus, for introducing gas into the apparatus;
(b) at least one valve arranged on the at least one gas inlet line, for controlling flow of gas in the at least one gas inlet line;
(c) at least one gas flow control line fluidly connected to the at least one gas inlet line through at least one gas inlet junction;
(d) at least one flow restriction arranged on the at least one gas inlet line;
(e) at least one gas flow controller arranged on the at least one gas flow control line; and
(f) at least one valve for controlling flow of gas in the at least one gas flow control line.

The flow restriction can preferably be provided between the gas inlet junction and the analytical apparatus. The invention can be extended to include at least one first flow restriction and at least one second flow restriction that are arranged on the at least one gas inlet line.

The invention can also be extended to provide such a gas inlet system in, or in combination with, a mass spectrometer, in particular a collision cell of a mass spectrometer.

The invention can further be extended to a mass spectrometer having a gas inlet system for introducing gas into a collision cell of the mass spectrometer.

Also provided is a method of controlling gas flow into an analytical apparatus, particularly for operating a gas inlet system according to the invention, the method comprising steps of flowing gas from at least one gas supply into at least one gas inlet line for providing gas into an analytical apparatus;

splitting away a portion of the gas flow in the gas inlet line into a gas control line that is arranged on the gas inlet line and that meets the gas inlet line at a gas line junction, such that a portion of the gas flow in the gas inlet line flows through the gas control line, and wherein gas flow in the gas control line is controlled by means of a gas flow controller;

whereby the portion of gas that is not split away from the gas inlet line into the gas control line is delivered into the apparatus.

Therefore, in embodiments, the invention involves the control of gas flowing to an exhaust (gas control line) in order to regulate the gas flowing into an analytical apparatus, rather than direct control of the gas flowing into the apparatus.

The gas inlet line and the gas control line can be any channel, tube, conduit, capillary or the like for transporting gas. Further, it will be apparent to the skilled person that additional components can be arranged on either or both of these gas lines, such as junctions, valves, flow restrictions, flow controllers, gauges and the like. These components can sometimes also be in fluid connection with the gas line. Gas lines that are herein described as being connected can be directly connected, or they can be fluidly connected through suitable means that are known to the skilled person.

The gas flow controller can preferably be provided downstream from the valve for controlling gas flow in the gas control line. The gas flow controller can also be open to atmosphere, or it can be connected to another gas line or a gas supply that can preferably be at or near atmospheric pressure.

The gas flow controller can be any suitable gas flow controller. In some embodiments, the controller is a back pressure regulator, a mass flow controller or a volume flow controller. In a preferred embodiment, the controller is a back pressure regulator.

The flow restrictions can be selected from any suitable restrictions that are known in the art for restricting flow in gas lines. The flow restrictions can in some embodiments be fixed flow restrictions.

In one arrangement, the first flow restriction can be arranged upstream from the gas inlet junction, and the second flow restriction can be arranged downstream from the gas inlet junction. In such a configuration, the first flow restriction is therefore positioned between the gas inlet junction and a gas supply, and the second flow restriction is positioned between the gas inlet junction and the analytical apparatus.

At least one valve can be preferably positioned between the second flow restriction and the apparatus. This valve serves the purpose of regulating the flow of gas into the analytical apparatus, such that when needed, the flow of gas into the apparatus can be switched off.

Gas flow rate through the gas inlet line is in general determined by the pressure difference across the flow restrictions. For example, gas flow through first flow restriction will be determined by the pressure difference between a gas supply feeding into the gas inlet line ($P_{in}$) and the pressure at the gas inlet junction. Likewise, gas flow through the second flow restriction will be determined by the pressure difference between the gas inlet junction ($P_i$) and the analytical apparatus. For improved gas flow control, it can therefore be suitable to arrange a plurality of first flow restrictions and/or a plurality of second flow restrictions. It can be preferable to arrange such a plurality of restrictions as a parallel arrangement of restrictions on the gas inlet line. The plurality of restrictions can be switchable, i.e. gas can be selectively directed through one or more of the restrictions as appropriate.

At least one valve can be arranged on the gas inlet line for selectively directing flow of gas through one or more of the parallel restrictions. For example, there can be a plurality of second flow restrictions provided in the system. The second flow restrictions thus provided can be fluidly connected to the gas inlet line on one end, and to the analytical apparatus on the other end. Valves can be suitably arranged between each of the flow restrictions and the analytical apparatus. Alternatively there can be at least one switch valve arranged upstream of the plurality of second flow restrictions, for selectively directing gas flow through one of the restrictions. Thus, by adjusting the position of suitably arranged valves, gas flow through the second flow restrictions can be selectively controlled.

A similar solution can be provided when a plurality of first flow restrictions are provided, arranged in parallel upstream from the gas inlet junction. Valves can be provided either upstream or downstream from the parallel restrictions, either as switch valves or as separate valves on lines upstream or downstream from the flow restrictions. Preferably, the valves can be provided upstream of the restrictions. Gas lines from the restrictions that are arranged in this configuration can preferably merge downstream from the restrictions on the gas inlet line, upstream from the gas inlet junction.

By adjusting the first and second flow restrictions and/or the pressure at the gas inlet junction and $P_i$, a very large range of the portion of gas flowing through the gas inlet line can be split away into the gas control line. Thus, in general, in the range of about 0.00001% to about 99.99% of the gas can be split away, such about 0.0001% to about 99.9% or about 0.001% to about 99.9%, about 0.01% to about 99.9%, or about 0.1% to about 99.9%. The lower range that is split away can be about 0.00001%, about 0.0001%, about 0.001%, about 0.01%, about 0.1%, about 0.5% or about 1%. The upper range that is split away can be about 99.999%, about 99.99%, about 99.9%, about 99.5%, about 99%, about 98%, about 97%, about 96% or about 95%.

In one arrangement, the gas inlet system according to the invention is provided in combination with an apparatus operating at low pressure, such as a collision cell of a mass spectrometer.

If the valves on the gas inlet line and the gas control line are both open, gas will be able to flow through the gas inlet line and the gas control line. The input pressure from a gas supply ($P_{in}$) can be defined by an external pressure reducer, e.g. at a gas flask. The gas flow controller on the control line will regulate the flow of gas in the line. The gas flow controller can be a back pressure regulator. In such a configuration, the pressure at the gas inlet junction will be determined by the back pressure regulator. Flow of gas through the first flow restriction will be determined by the difference in pressure in a gas supply providing gas into the gas inlet line ($P_{in}$), and the pressure at the gas inlet junction ($P_i$), and the flow of gas through the second flow restriction will be determined by the difference in pressure at the gas inlet junction ($P_i$) and the pressure in the analytical apparatus ($P_o$). In the case where the system is used in conjunction with a low pressure system of a mass spectrometer (e.g. a collision cell), the latter can be estimated to be zero. The gas flow in the system can be approximated by the Poisseuille formula $$\Phi = \frac{dV}{dt} = v\pi R^2 = \frac{\pi R^4 (P_i - P_o)}{8\eta L} \times \frac{P_i + P_o}{2P_{ref}} = \frac{\pi R^4}{16\eta L}\left(\frac{P_i^2 - P_o^2}{P_{ref}}\right)$$

Where $\Phi$ is the volumetric gas flow rate, $P_i$ is the inlet pressure (here, the pressure at the gas inlet junction), $P_o$ is the outlet pressure, $P_{ref}$ is the reference pressure for the volumetric flow (typically 1 bar or standard pressure (1.013 bar), L is the length of the tube, $\eta$ is the gas viscosity, R is the radius of the tube, V is the volume at the outlet pressure and v is the gas velocity at reference pressure. If $P_O<<P_i$, the gas flow is therefore proportional to $P_i^2$.

In general terms, the pressure at the gas inlet junction can be adjusted to range from the pressure in the analyser (which is very low) and as high as the pressure at the gas reservoir. By adjusting the pressure and the restrictions, the gas flow into the analyser can be regulated.

In an arrangement where the gas flow controller, for example a back pressure regulator, is open to atmosphere, the minimum pressure at the gas inlet junction is approximately 1 bar(ambient pressure). Since gas flow in the system is proportional to the pressure squared, a pressure of close to 5 bar absolute is needed to achieve a flow range of about 20 through the second flow restriction. This is feasible, but it can be advantageous to operate the system at lower pressure, for example due to valve ratings, and also so as to achieve a higher range of flow as now described.

Accordingly, in some embodiments of the system, at least one vacuum pump is fluidly connected to the gas control line, downstream from the gas flow controller. The vacuum pump can be provided as a single pump. The vacuum pump can also be provided as a plurality of vacuum pumps that are sequentially arranged. The exhaust of the vacuum pump can be open to atmosphere. The vacuum pump can also be a part of a vacuum pumping system of a mass spectrometer. The analytical apparatus is preferably under vacuum, e.g. using the same vacuum pump.

The flow restrictions in the gas inlet system, in combination with the adjustable pressure at the gas inlet junction, can be selected so as to provide any desirable gas flow rate into the analytical apparatus. Thus, gas flow rates into the analytical apparatus can in general be in the range of about 0.1 to about 100 mL/min, or about 0.2 to about 50 mL/min, or about 0.3 to about 30 mL/min. Further, depending on the gas pressure into the gas inlet line, and the gas pressure at the gas inlet junction, the ratio of gas flow through the first and second flow restriction can take on any desired value. In some embodiments, the ratio of gas flow through the first and second flow restriction, at a fixed gas pressure at the gas inlet, and depending on the back pressure set by the flow controller, can be in the range of about 1:1 to about 1000:1, about 1:1 to about 500:1, about 1:1 to about 100:1, about 1:1 to about 50:1 or about 1:1 to about 20:1. In some embodiments, the ratio of gas flow through first and second flow restriction can be in the range of 1:1 to 1000:1, in the range of 1:1 to 500:1, in the range of 1:1 to 100:1, in the range 1:1 to 50:1, or in the range 1:1 to 20:1. In some embodiments, the restrictions are structured such that the ratio of gas flow through the first and the at least one second flow restriction, for the same pressure difference across both restrictions, is in the range of 1:10 to 10:1, in the range of 1:8 to 8:1, in the range of 1:5 to 5:1 or in the range of 1:3 to 3:1.

It should also be noted that when the system is used with different gases, each gas can be connected to different gas inlet lines. Since different restrictions can be placed on the different lines, different flow rates can be achieved for different gases, even in the case where gas supply pressure is maintained constant.

The flow controller on the gas control lines sets the pressure in the gas inlet line, in particular at the gas inlet junction. Gas flow through the second flow restriction is proportional to the difference between this pressure and the pressure in the analytical apparatus. The pressure in the analytical apparatus can be less than 200 mbar, less than 100 mbar, less than 50 mbar, less than 40 mbar, less than 30 mbar, less than 20 mbar, less than 10 mbar, less than 5 mbar, less than 1 mbar, less than 0.05 mbar, less than 0.01 mbar, less than 0.005 mbar or less than 0.001 mbar. The pressure in the analytical apparatus for a first type of apparatus can be in the range of about 5 to 200 mbar, about 10 to 100 mbar, about 1 to 0.001 mbar, about 0.1 to 0.001 mbar or about 0.01 to 0.001 mbar. For a second type of analytical apparatus, the pressure in the apparatus may be about 0.1 to about $10^{-4}$ mbar, about 0.01 to about $10^{-4}$ mbar, or about 0.001 to about $10^{-4}$ mbar. Thus, for any given configuration of flow restrictions in the system, the gas flow controller can be used to set the back pressure in the gas control line and thereby the flow rate into the analytical apparatus.

By adjusting the setting of the gas flow controller, a second back pressure in the gas control line can be set, different from the first back pressure, which results in a second flow rate into the analytical apparatus. Further adjustment of the back pressure can be made by changing the setting on the flow controller, so as to achieve different flow rates into the analytical apparatus. Further, or complimentary, adjustments in flow rate into the apparatus can be made by switching to different restrictions on the gas inlet line, for example by means of different second flow restrictions. The flow of gas into the analytical apparatus can thus be selectively directed through at least one second flow restriction on the gas inlet line, so as to selectively control the flow of gas into the analytical apparatus The back pressure in the gas control line can in general be any value less than $P_{in}$, the pressure into the gas inlet line. In the present context, "bar(g)" refers to "bar(gauge)", which is the pressure above atmospheric pressure, and "bar(a)" refers to "bar(absolute)", which is the absolute pressure. In some embodiments, the back pressure is less than 5 bar(g), less than 1.5 bar(g) less than 1 bar(a), less than 500 mbar(a), less than 200 mbar(a) or less than 100 mbar(a). The back pressure in the gas control line may be more than 1 mbar(a), or more than 10 mbar(a) or more than 50 mbar(a) or more than 100 mbar(a). A preferred range back pressure in the gas control line may be 1.5 bar(a) to 100 mbar(a), or may be 1.5 bar(a) to 50 mbar(a), or may be 1.5 bar(a) to 10 mbar(a), or may be 1 bar(a) to 100 mbar(a), or may be 1 bar(a) to 50 mbar(a), or may be 1 bar(a) to 10 mbar(a). A wide range of flow rates can thus be achieved, for example flow rates that differ by a factor of up to 10, or up to 50, or up to 100, or up to 150, or up to 200, or up to 250.

The valve for controlling gas flow in the gas control line can suitably be provided as a valve on, or in fluid communication with, the gas control line. It is also possible that a plurality of gas control lines be provided in the gas inlet system, and wherein at least one valve for controlling gas flow in the plurality of lines is provided. The plurality of gas control lines can be each connected to a respective gas inlet line. The plurality of gas control lines can also merge at one or more gas control line junction. The control lines can all merge at one junction, or they can merge at a plurality of junctions. It can be preferable that the control lines merge, through one or more gas control line junctions, into a single gas control line upstream from the gas flow controller on the gas control line. This way, a single gas flow controller can be used to regulate gas flow in the gas control lines. One or more valves can be provided on the gas control lines, for selectively controlling gas flow in the plurality of gas control lines. The valves can be provided on the individual lines and/or at the one or more gas control line junctions.

In one embodiment, there can be provided in the gas inlet system according to the invention:
 a plurality of gas inlet lines, each line being fluidly connected to the analytical apparatus;
 a plurality of gas control lines, each fluidly connected to a respective gas inlet line; and
 wherein the gas control lines merge at one or more gas control line junction upstream from the gas flow controller.

Preferably, there can also be provided at least one valve for selectively controlling gas flow in the gas control lines. The at least one valve can for example be provided on one or more of the gas control lines, and/or at one or more gas control line junction.

When the gas inlet system according to the invention is provided as a system comprising a plurality of gas inlet lines, flow of gas in each gas inlet line can therefore be controlled by splitting away a portion of gas flow in each of the gas inlet lines. The flow of gas in each of the gas inlet lines can be provided by at least one gas supply. When multiple gas supplies are used, the plurality of gas inlet lines are useful for being able to switching between gases that flow into the analytical apparatus, with minimal switching time being required to reach an equilibrium with respect to gas composition in the analytical apparatus.

When provided as a plurality of gas control lines, it can be preferable that the gas control lines be connected to a single gas flow controller. As a result, an advantage of the invention is that a single gas flow controller can be used to regulate the flow of multiple gas types, such as collision gases. A separate mass flow controller is not required for each gas inlet line compared to the prior art, thus saving cost. Further, it is advantageous to not position the gas flow controller directly on a gas line that feeds into the analytical apparatus. This is because gas flow controllers, such as mass flow controllers, have a fairly large dead volume that takes a long time to flush after changing gases. The present invention provides a solution that uses a single flow controller that is not in-line but rather on a separate line to control the back pressure in the gas inlet line, and as a consequence the time required for the system to reach equilibrium after switching gases is minimal, compared with conventional in-line solutions.

Another advantage is, that the risk of contaminating the gas is drastically reduced. A gas flow controller has a lot of different surfaces in contact with the gas. Some controllers are made of polymer materials that will to some amount release small organic molecules like hydrocarbons. The total surface area of the controller is critical as the larger the area the more water will typically be adsorbed and may therefore also be desorbed or released into the gas. Some gas controllers have optimized cleaning procedures, and/or the materials are chosen to minimize gas release. Putting the gas controller not into the gas stream flowing into the analyzer is less costly, and more effective.

It is also possible that at least one flow restriction be provided on the gas control line, or when provided as a plurality of gas control lines, on one or more of the thus provided control lines. By means of such flow restrictions, gas flow in the gas control line can be further controlled, for example to prevent or minimize risk of back-diffusion in the gas control line. The flow restriction can be arranged between the valve for controlling gas flow in the control line and the gas flow controller. The flow restriction can also be provided as switchable restriction, that can for example be provided as one or more restrictions on separate lines that are arranged in parallel with the gas control line and that connect to the gas control line at a first and a second junction, and wherein at least one valve is further provided for selectively directing gas flow through the one or more restrictions. The at least one valve can be provided at the first or second junction, for example as a switch valve. The at least one valve can also be provided on each of the separate lines. Alternatively, a combination of valves can be provided, arranged at the first and/or second junction, or on one or more of the separate lines.

To prevent back flow in the gas control line, there will always be a flow of gas through the gas control line (i.e. through the gas flow controller). Often, it is advantageous that this flow is not too high, in order to minimize the gas consumption. It is possible to adjust the restrictions in a way that the total gas flow through the set up is only slightly higher than the maximum of the gas flow into the analyzer. Thus, the total gas flow can be as low as up to 25% higher, up to 10% higher or even up to 5% higher than the gas flow into the analyser.

Stable flow or pressure control is more easily achievable if gas flow rates are not too low. As a consequence, very low gas flow rates can be problematic for back pressure regulators and flow controllers. This can be addressed by increasing gas flow through the first restriction, i.e. by making the first restriction less restrictive. This however leads to increased gas consumption in the system. An alternative solution is provided by increasing gas flow through the flow controller by arranging a bleed restriction on the gas control line upstream of the flow controller, e.g. between the valve for controlling gas flow in the control line and the flow controller, or upstream of that valve. The bleed restriction can be provided as a flow restriction on a vent line that is fluidly connected to the at least one gas flow control line upstream of the flow controller, e.g. between the at least one valve for controlling gas flow and the gas flow controller, or upstream of that valve. The vent line can be open to atmosphere. Alternatively, the vent line can be open to a gas reservoir.

It should be appreciated that the gas inlet system according to the invention can be provided in combination with at least one gas supply. Preferably, there is also provided at least one valve for controlling flow of gas from the gas supply into the gas inlet line. The system can also be configured to be used with a plurality of gas supplies. In such an arrangement, each gas supply can be connected to a respective gas inlet line.

The system according to the invention can be configured to include at least one controller for controlling valve position of at least one valve. The controller can preferably be adapted so that it can receive an input about at least one system parameter, for example a parameter that reflects the presence and/or absence, concentration, gas flow and/or pressure of gas in the system (e.g. at one or more points in the system), and provide a signal to at least one valve based on the parameter information. The system parameter can also include data about gas composition and/or concentration and/or pressure in a collision cell to which the gas inlet system is connected. In some embodiments, the controller is adapted to receive an input about the concentration or pressure or flow rate of at least one gas, and wherein the controller is able to adjust the position of at least one of the valves in the system based on the input parameter. In some configurations, the controller is adapted to adjust the position of at least one valve, such as at least one switch valve. The valves can therefore also be adapted to be able to receive input from a controller, to change their position depending on the signal from the controller. The controller can also be adapted to receive an input about time that has passed during one or more stages of the system, for example time that has lapsed since the type of collision gas in the system has been changed. The controller can thus be adapted to regulate the position of one or more valves based on sample gas concentration, sample gas presence or sample gas absence, or time parameters. The one or more valves controlled by the controller may comprise any one or more of the valves on any of the gas lines as described herein (e.g. valves on the gas inlet line, gas control line etc.) The controller can also be adapted to regulate the position of at least one flow controller in the system, such as a mass flow controller or back pressure regulator.

In certain embodiments of the invention, one or more of the junctions of the system are provided as a T-junction. In this context, a T-junction means any junction of three flow channels, i.e. a junction that contains three arms. The T-junction can be provided as a T-piece, as a Y-piece, or as a junction of three orthogonal channels. The junction can further be provided as a two-dimensional junction, wherein the three channels lie within the same plane, or the junction can be provided as a three dimensional structure, in which the three channels do not all lie in the same plane (i.e., as a three-dimensional "tripod").

Components of the system according to the invention, for example the gas inlet line and the gas control line, and including junctions that are described herein, can be provided in a machined block, i.e. as one mechanical piece. This means that manufacturing of the system, or portions of the system, can be performed by machining out of a bulk of material, such as a metal block. Further, using T-junctions, with or without manufacturing in a machined block, ensures that flow through the openings in the junction are under full mechanical control. The T-junction design ensures that diffusion paths are well separated, which facilitates setup and calibration of the system, because its flow properties are well determined and predictable.

Further, it should be appreciated that the invention can be combined with gas inlet systems that are known in the art, including for example carrier gas inlet systems that provide gas flow for transporting gas in analytical systems.

The above features along with additional details of the invention, are described further in the examples below, which are intended to further illustrate the invention but are not intended to limit its scope in any way.

BRIEF DESCRIPTION OF THE DRAWINGS

The skilled person will understand that the drawings, described below, are for illustration purposes only. The drawings are not intended to limit the scope of the present teachings in any way.

DESCRIPTION OF VARIOUS EMBODIMENTS

In the following, exemplary embodiments of the invention will be described, referring to the figures. These examples are provided to provide further understanding of the invention, without limiting its scope.

In the following description, a series of steps are described. The skilled person will appreciate that unless required by the context, the order of steps is not critical for the resulting configuration and its effect. Further, it will be apparent to the skilled person that irrespective of the order of steps, the presence or absence of time delay between steps, can be present between some or all of the described steps.

It should be appreciated that the invention is applicable for gas inlet systems in analytical systems general, including mass spectrometers and in particular in collision cells for use in mass spectrometers. In general, therefore, the gas that is being delivered in the system will be variable. Further, the system and method according to the invention is illustrated in the embodiments that follow with a preferred embodiment of collision cell, but it should be appreciated that the invention is also applicable to other analytical systems that include or involve gas delivery components.

Figure 1:
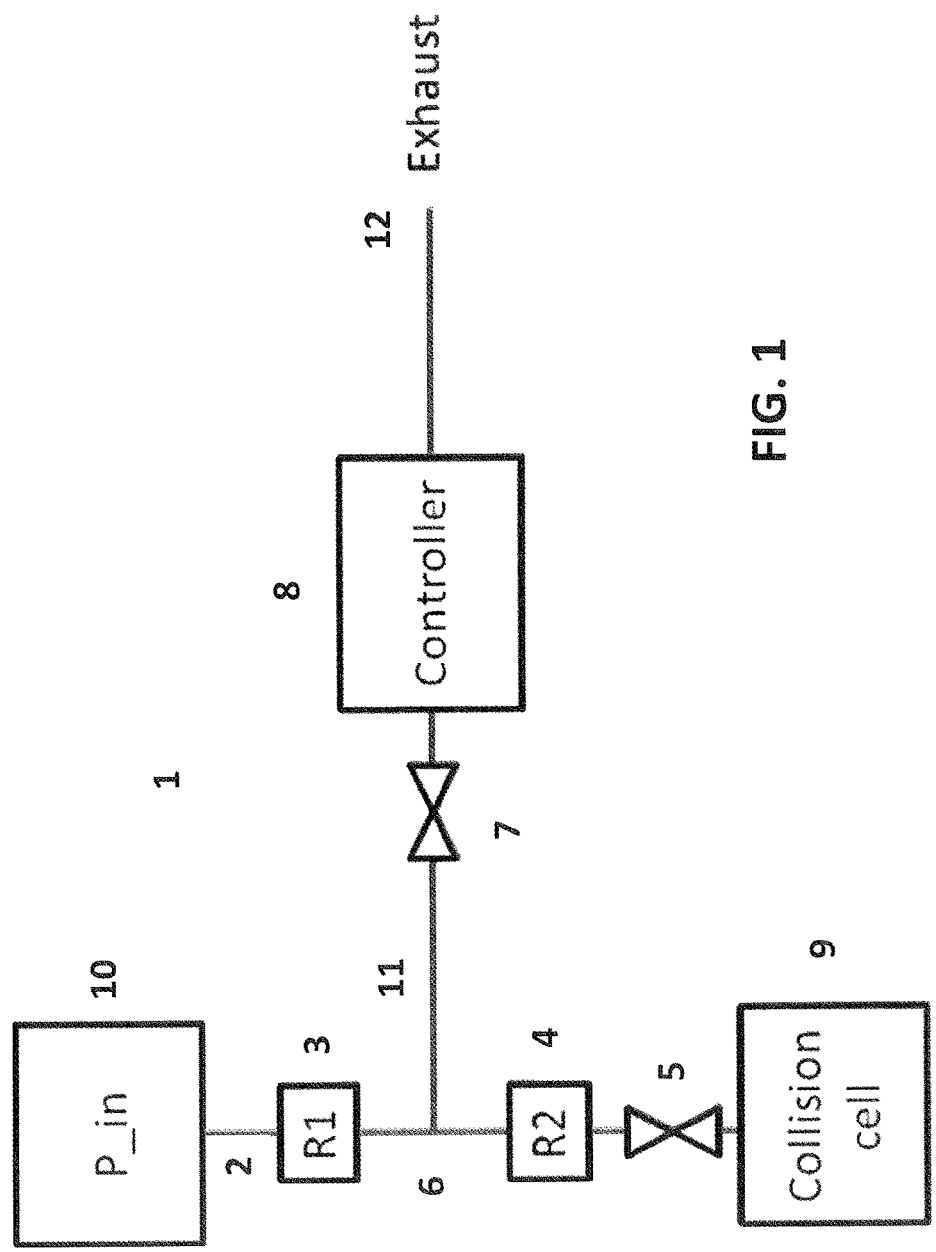
FIG. 1 shows a gas inlet system according to the invention.

Referring to FIG. 1, there is schematically shown a gas inlet system 1, for delivering gas from a gas supply 10 into a collision cell 9, having a gas inlet line 2 and a gas control line 11, that are connected at a gas line junction 6. A first flow restriction 3 and a second flow restriction 4 are arranged on the gas inlet line 2. Valves 5, 7 are arranged on the gas inlet line and the gas control lines, respectively. A flow controller (back pressure regulator) 8 is arranged on the gas control line, downstream from the valve 7. In this embodiment, the flow controller is not pumped and simply exhausts to atmosphere through exhaust 12.

If the gas is not to be used in the collision cell, valves 5, 7 are kept closed. Opening the valves results in gas flowing through the restriction 3 towards the gas inlet junction 6. If the system uses a back pressure regulator, the pressure at this point in the system ($P_i$) is regulated by the back pressure regulator 8. Gas flow through the restriction 3 is therefore defined by $P_{in}$, the pressure from the gas supply, and the pressure $P_i$ at the gas inlet junction 6. Gas then flows from the gas inlet junction and through the second restriction 4, into the collision cell 9. Since the pressure in the collision cell is very low, e.g. 0.01 mbar or less, the flow rate through the second restriction is controlled by $P_i$, in accordance with the Poisseuille formula.

Flow rates in the system can be adjusted by altering $P_{in}$ and/or $P_i$, and/or by changing the flow restrictions 3, 4. For example, doubling $P_i$ results in a roughly 4-fold increase in flow rate through the restriction 4, a five-fold increase in $P_i$ results in more than a 20-fold increase in flow rate, and so on. However, due to the fact that the lowest value of $P_i$ achievable in this setup (ambient pressure) is 1 bar, $P_i$ would have to set to almost 5 bar to achieve a 20-fold change in flow rate.

Although feasible, it might be advantageous to operate the system at lower pressure, for example due to valve ratings. Further, a larger range in pressure and therefore a larger range in achievable flow rates, would be advantageous.

Figure 2:
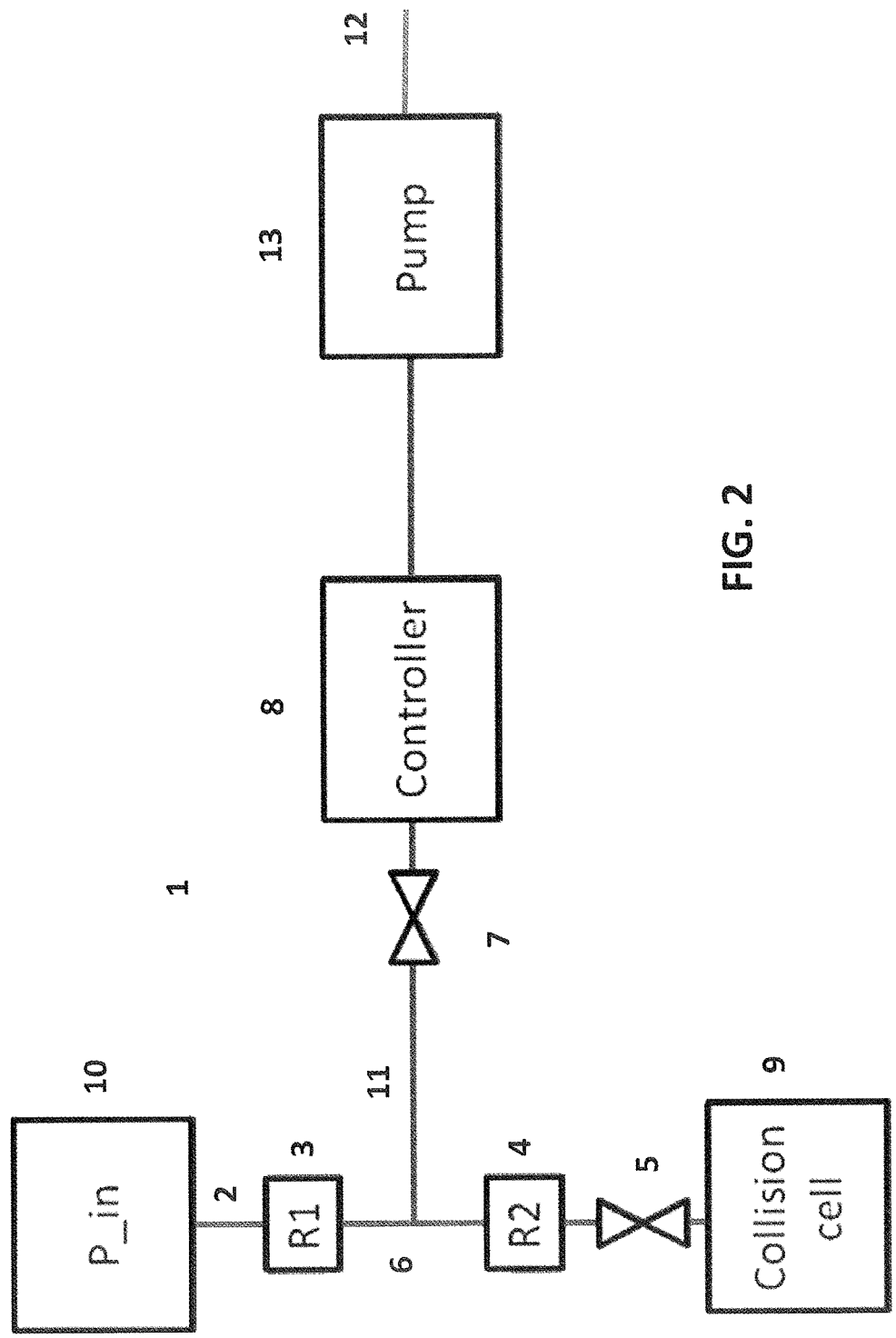
FIG. 2 shows a gas inlet system that further includes a vacuum pump on the gas control line.

Accordingly, turning to FIG. 2, an alternative embodiment of the system includes a vacuum pump 13 that is arranged on the gas control line 11 downstream of the flow controller. In this configuration, $P_i$ can be set as appropriate to achieve any desired flow rate into the collision cell 9. As an example, by arranging appropriate restrictions 3, 4 on the gas inlet line 2, and control $P_i$ between 100 mbar and 1 bar, gas flow that differs by a factor of 100 is achievable.

Care must be taken when configuring the system that the flow rate through the control line 11 is always high enough so that no back diffusion into the gas inlet line 2 occurs. However, this is achievable by adjusting the pressure and restrictions in the system, and by adjusting the restriction of the gas control line.

The vacuum pump 13 can have an exhaust that is open to atmosphere. However, multiple vacuum pumps can also be used with the system, for example pumps that are sequentially arranged. The vacuum pump can also be a part of, or be connected to, the vacuum pump system of a mass spectrometer.

The system can be set up so that gas flow of multiple gases can be individually controlled using a single flow controller. An example of a set up for 2 gases is shown in FIG. 3, although the skilled person will appreciate that this setup can be equally applied for any number of gases, through additional gas lines.

Figure 3:
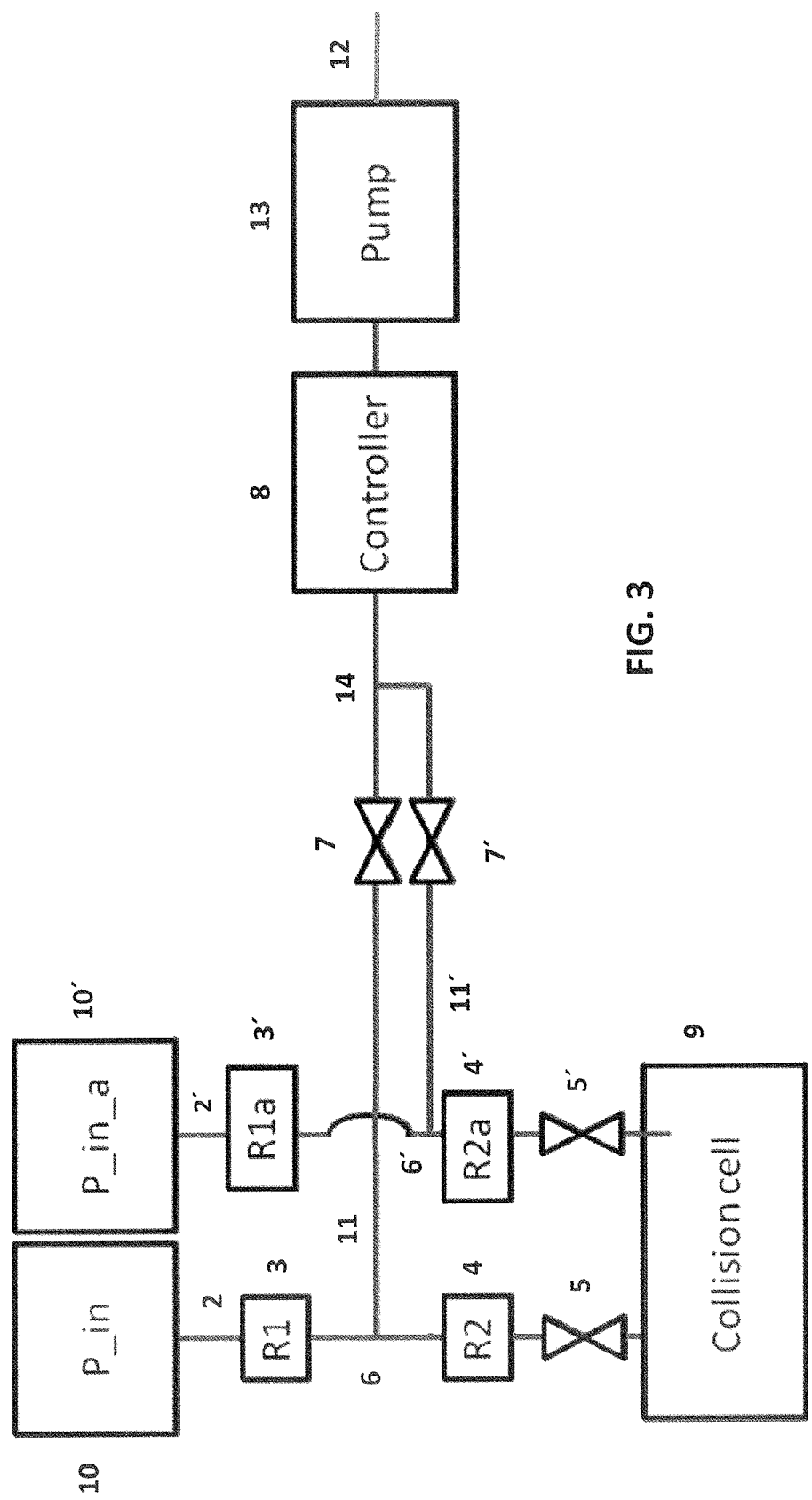
FIG. 3 shows a configuration of the gas inlet system that has two gas inlet lines, each connected to a gas control line.

In FIG. 3, two gas supplies 10, 10' are shown, each being connected to a gas inlet line 2, 2' that feed into a collision cell 9. Each gas inlet line is connected to a respective gas control line 11, 11' that merge at a gas control line junction

14. Valves 7, 7' control gas flow through the gas control lines. In an alternative configuration, a single switch valve can be arranged at the control line junction 14. A single flow controller 8 is connected on the gas control line, downstream from the control line junction 14.

Thus, in this configuration, a single flow controller can be used to regulate gas flow in the two gas inlet lines 2, 2'. By configuring the restrictions 3, 3' and 4, 4', on each respective gas inlet line, and gas pressure $P_{in}$ and $P_i$, the latter through the back pressure regulator 8, flow rates in each gas inlet line can be independently set to any desired value. Thereby, individual flow rates for different gases, each fed through separate gas inlet lines, is possible. The gas flows from each gas supply 10, 10' could be flowed into the cell 9 simultaneously or, more typically, at different times. Appropriate operation of valves 5, 7 and 5', 7' permit either one or both of the gas supplies to be connected to the cell at one time.

Figure 4:
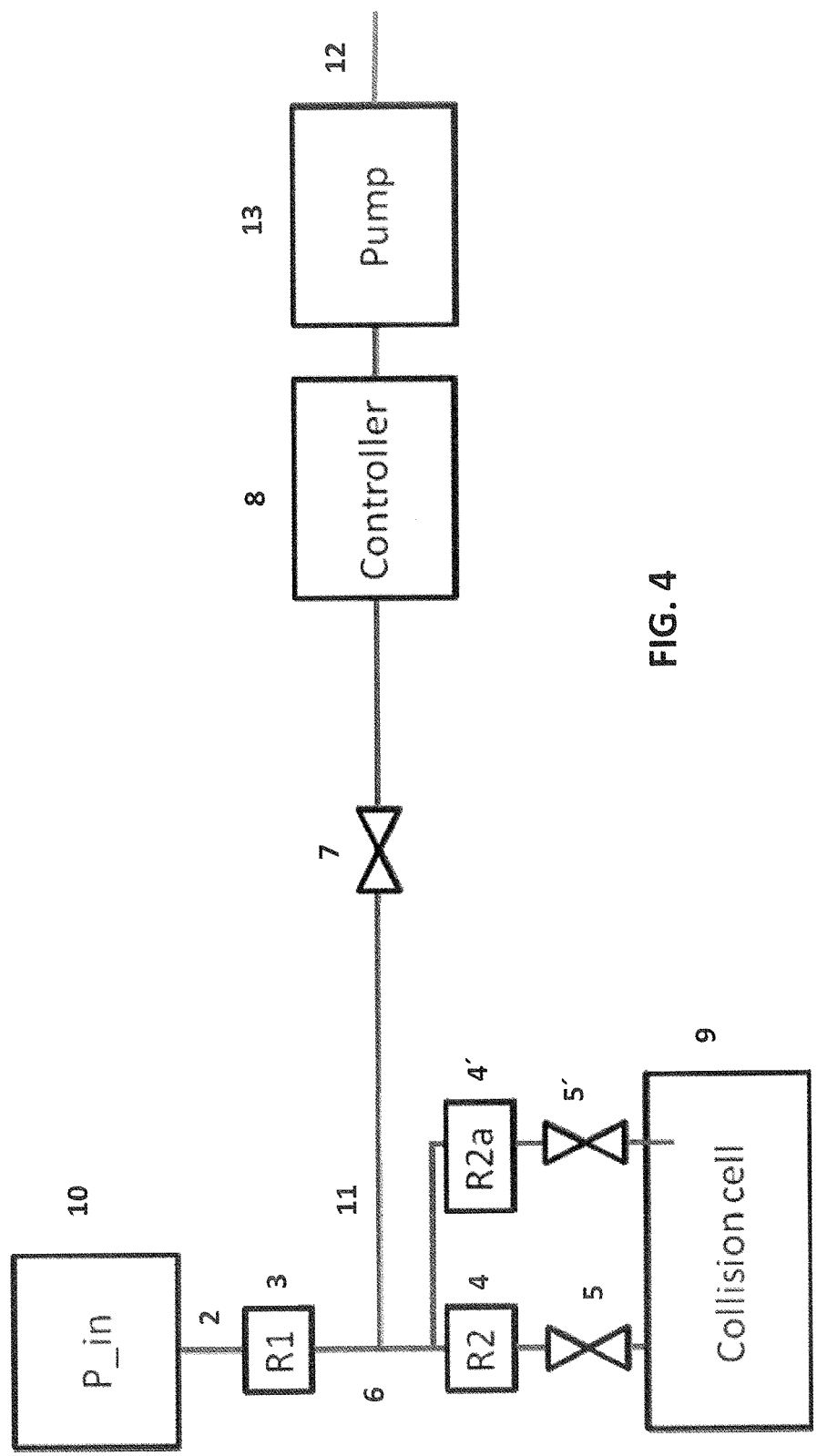
FIG. 4 shows a configuration having a switchable second restriction on the gas inlet line.

The gas inlet system can be arranged to include switchable flow restriction, to further expand the capabilities of the system. In FIG. 4, an example of such a setup is provided. Here, two second flow restrictions 4, 4' are arranged on a single gas inlet line 2. The restrictions are switchable through two valves 5, 5' that are arranged between the restrictions and the collision cell 9.

By having switchable restrictions on the gas inlet lines, further possibilities for adjusting flow rates are possible. Thus by having different restrictions, the range of flow rates can be expanded for any given configuration of the gas control line 11.

It should be appreciated that additional parallel restrictions can be arranged in the same manner on the gas inlet line as appropriate, and additional valves included so as to be able to selectively direct gas flow through any one restriction.

Further, a similar arrangement of restrictions can be arranged on the gas control line. Such restrictions are arranged between the valve 7 and the flow controller 8. Through such an arrangement of restrictions, the flow rate in the gas control line can be adjusted. This can be especially important at low flow rates when there is an increased risk of back flow. Another advantage of this position of the switchable restriction would be that gas flowing through these switchable restrictions is not introduced into the analyzer; therefore, the demands on cleanness, low dead volume etc are very relaxed, and the relaxation time after switching the restrictions are minimized.

Flow controllers, for example when provided as a back pressure regulator, can have problems when operating at very low flow rates. One way of handling low flow rates is to make the restriction 3 in the system less restrictive, thereby increasing flow rate into the gas control line without affecting other parameters in the system. However, this has the drawback that gas consumption in the system is increased.

Figure 5:
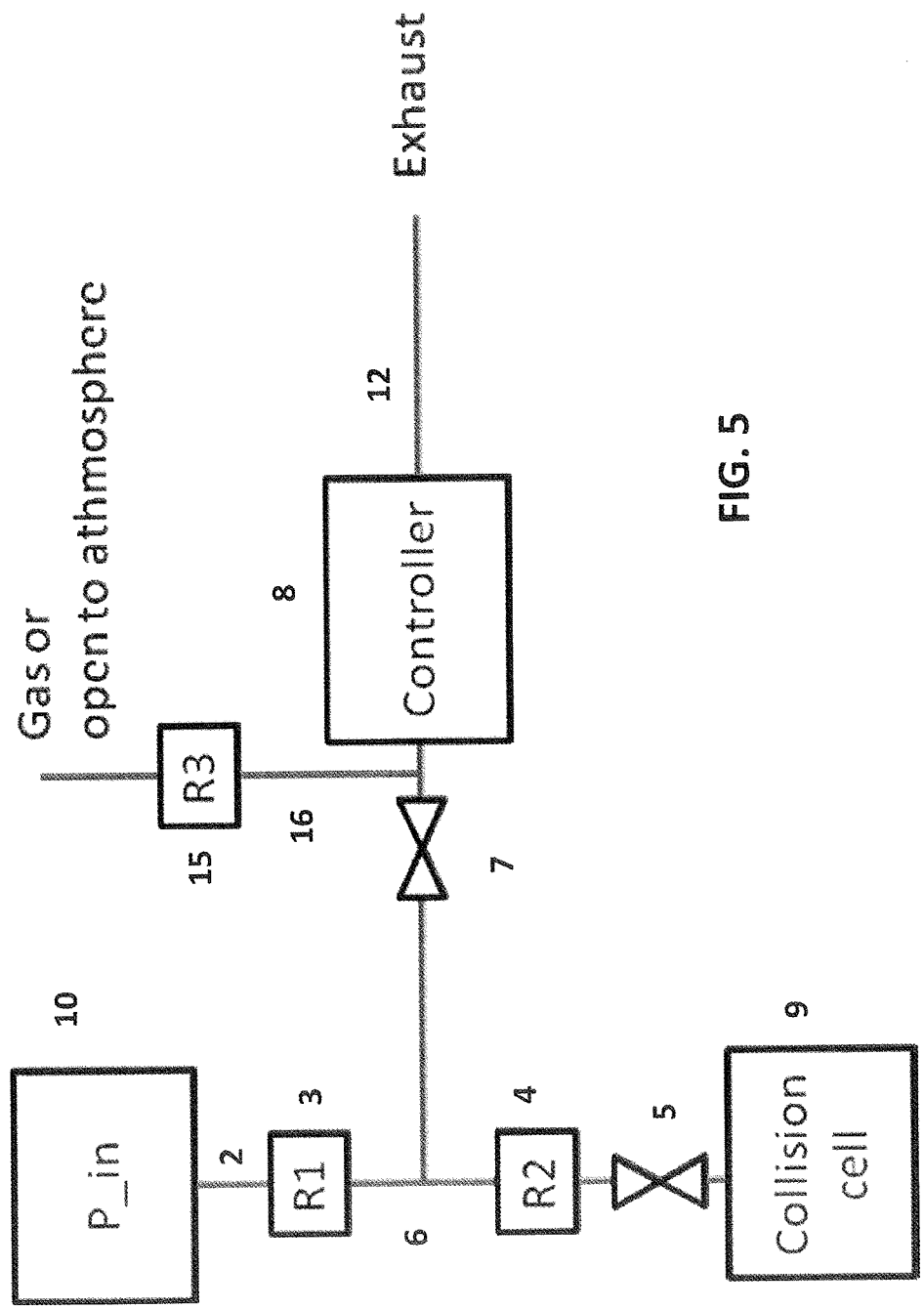
FIG. 5 shows a configuration having a bleed restriction on the gas control line.

In FIG. 5, an alternative arrangement is shown that provides a solution to this dilemma, in which a bleed restriction 15 is provided on a vent or bleed line 16 that is arranged between the valve 7 and controller 8. The vent line can be open atmosphere, or alternatively it can be open to a gas reservoir. In this configuration, the controller 8 can handle even very low flow rates in the gas control line, since additional flow through the controller will be provided by the bleed vent. Care must be taken in this setup to maintain flow through the control line high enough so that there is no back flow of gas in the gas control line, since the bleed is open to atmospheric pressure. The restriction 15 can be adjusted so as to provide adequate flow of gas into the controller while minimizing risk of back flow.

As should be appreciated by the foregoing description of particular embodiments of the system according the invention, the system is highly adaptable, and can be configured to provide a large range of flow rates at different pressures. A few exemplary arrangements of the system, showing how flow rates can vary based on different configurations and pressures, will now be described.

Figure 6:
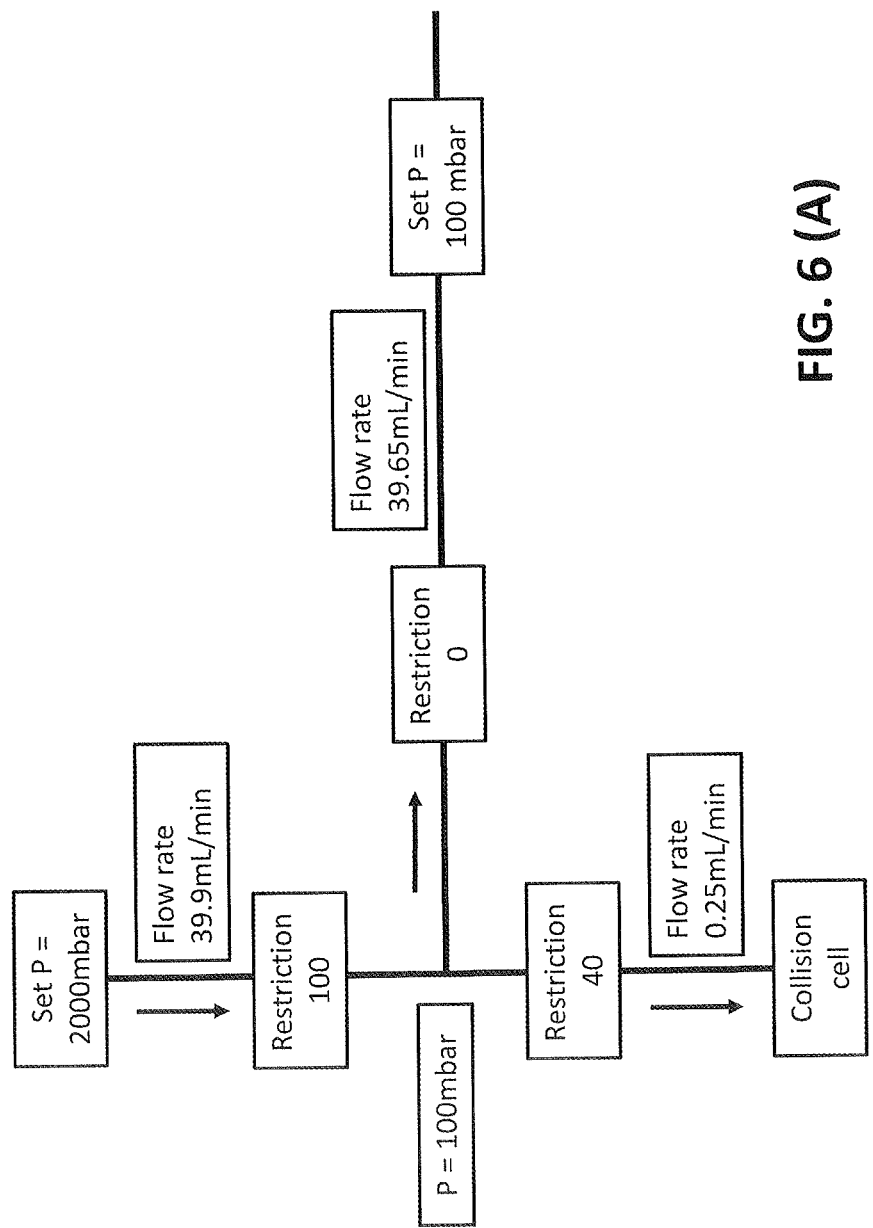
FIG. 6 shows different flow rates achievable by the gas inlet system according by the system for different values of gas inlet pressure, $P_{in}$, pressure at the gas inlet junction, $P_i$; (A) $P_{in}$ set at 2000 mbar and $P_i$ at 100 mbar; (B) $P_{in}$ set at 2000 mbar and $P_i$ at 1069 mbar(ambient pressure); (C) $P_{in}$ set at 5000 mbar and $P_i$ at 4050 mbar. Restrictions are shown in arbitrary units.
Figure 6:
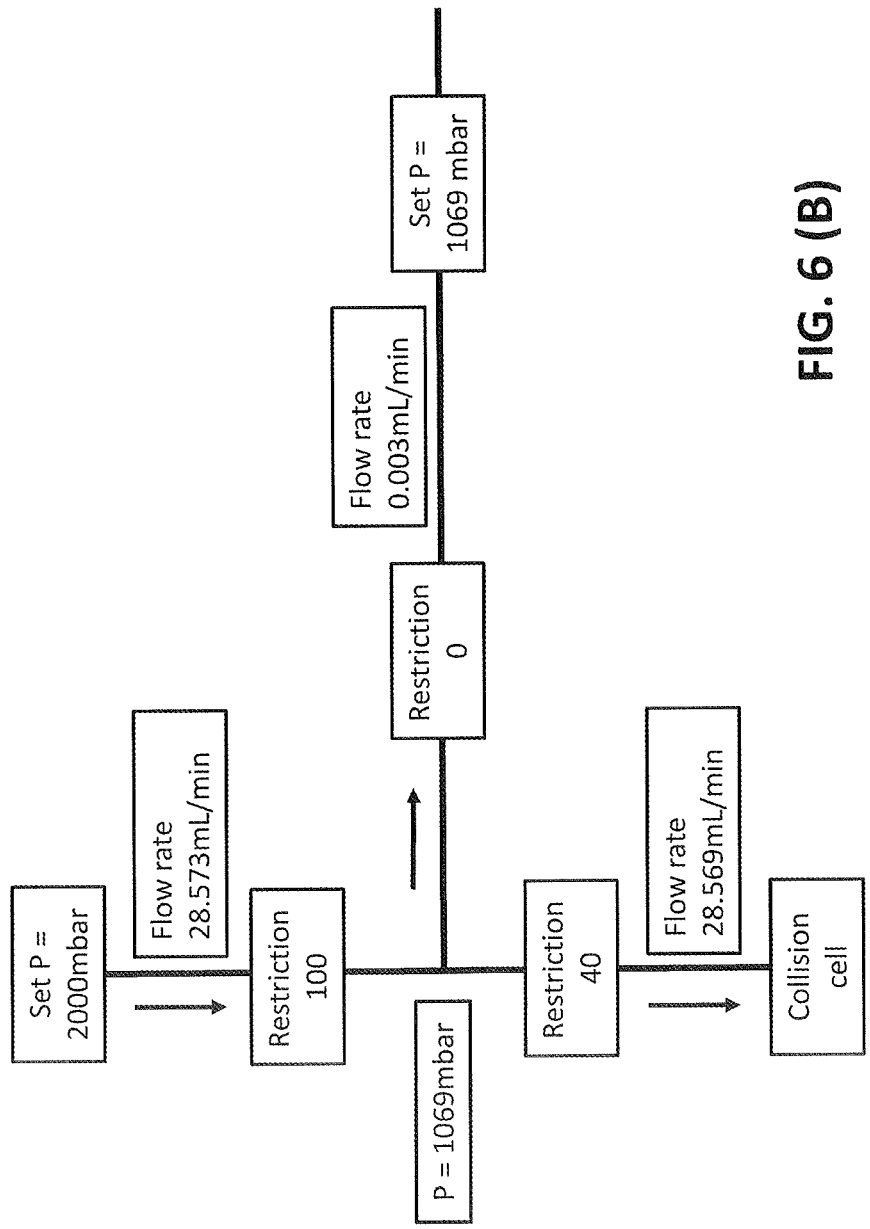
Figure 6:
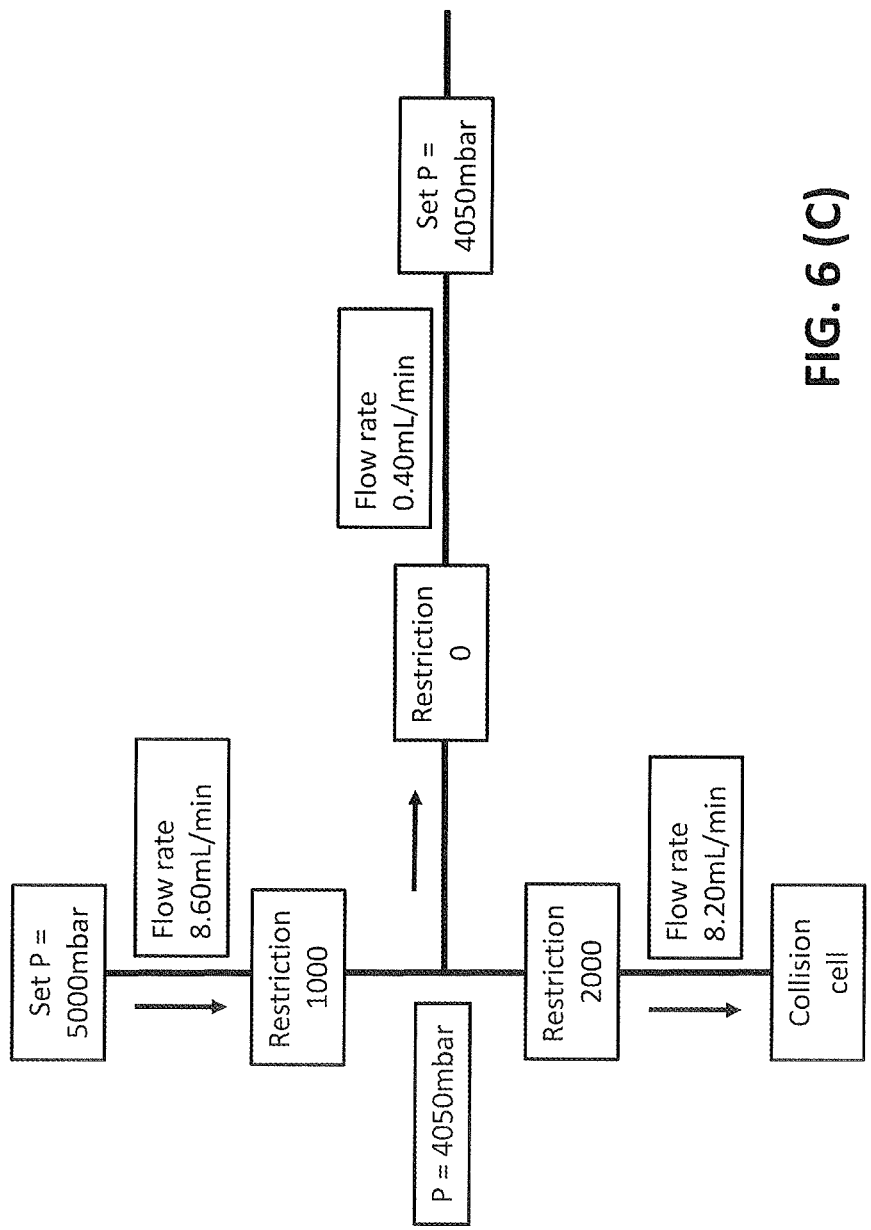

Thus, turning to FIG. 6, results of simulations showing the effects of different setups are shown. The simulations were done for a configuration of the system that contain a single first restriction and a single second restriction. In a first setup, $P_{in}$ is set to 2 bar(a). Restrictions are shown in arbitrary units, and flow rates in the control line for different values of $P_i$ are shown in (A) and (B), respectively. Thus, when $P_i$ is set at 100 mbar(a) by the back pressure regulator, (A), the flow rate from the gas supply is 39.9 mL/min, the flow rate through the second restriction to the collision cell is 0.25 mL/min, and the flow rate in the control line is 39.65 mL/min. Accordingly, a majority of the gas is delivered through the control line to atmosphere. In (B), $P_i$ has been set to 1069 mbar(a) (ambient pressure), which results in a flow rate through the second restriction to the collision cell of 28.6 mL/min, while the flow rate through the control line is now very low, or about 0.003 mL/min. As a consequence, through a 10-fold decrease in $P_i$ more than a 100 fold change in flow rate through the second restriction, into the analytical system, is achieved.

A simultaneous increase in the restrictions by a factor of 10 would result in flow rates that range between 0.025 and 3 mL/min, i.e. the flow rate is linear with respect to the restriction. As will be noted, gas consumption in this setup is highest when the flow rate into the analytical apparatus is lowest, due to the fact that most of the gas is released to atmosphere through the control line.

If there is no vacuum pump in the system, $P_i$ can never be lower than ambient pressure (1 bar(a)). In the configuration shown in (C), $P_{in}$ has been set to 5000 mbar(a), and $P_i$ is set at 4050 mbar(a). The restrictions are 1000 and 2000, respectively, resulting in a flow rate of 8.2 mL/min into the analytical apparatus, with a flow rate from the gas supply of 8.60 mL/min and a flow rate in the control line of 0.40 mL/min. Increasing the inlet pressure $P_{in}$ to 6000 mbar(a), a flow rate of 12 mL/min into the analytical apparatus is achievable, while a reduction to 1000 mbar(a) at the junction point ($P_i$) results in a flow rate of 0.5 mL/min. Accordingly, for this configuration, a 24-fold range in flow rates is achievable.

As should be appreciated based on the foregoing description of the invention and some of its embodiments, the invention provides distinct advantages over gas inlet systems that are known in the art. Some of these advantages include:

- a single flow controller can be used for switching between multiple gases
- switching time between gases is minimal
- cost savings, compared with use of multiple flow controllers
- a very high range of flow rates are possible, in particular when using a vacuum pump in the system
- providing switchable restrictions increases the flow rate range to values not achievable with a conventional positioning of a flow controller
- gas consumption can be fairly low
- use of bleed restriction facilitates regulation of flow rates gas passing through the flow controller is not introduced into the analytical apparatus, which has several distinct advantages:

impurities from the flow controller therefore not contaminating no risk of particles from flow controller entering analytical apparatus even on first use, flushing time is minimal As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components.

The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

The term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

It will be appreciated that variations to the foregoing embodiments of the invention can be made while still falling within the scope of the invention can be made while still falling within scope of the invention. Features disclosed in the specification, unless stated otherwise, can be replaced by alternative features serving the same, equivalent or similar purpose. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise.

All of the features and/or steps disclosed in the specification can be combined in any combination, except for combinations where at least some of the features and/or steps are mutually exclusive. In particular, preferred features of the invention are applicable to all aspects of the invention and may be used in any combination.

The invention claimed is:

1. A gas inlet system for providing gas into an analytical apparatus operating under vacuum, the system comprising
   (a) a plurality of gas inlet lines fluidly connected to the apparatus, for introducing gas into the apparatus;
   (b) at least one valve arranged on the plurality of gas inlet lines downstream of at least one gas inlet junction, for controlling flow of gas in the plurality of inlet lines;
   (c) a plurality of gas flow control lines each fluidly connected to a respective gas inlet line of the plurality of gas inlet lines through the a respective gas inlet junction, wherein the plurality of gas flow control lines merge into a single gas flow control line;
   (d) at least one first flow restriction and at least one second flow restriction arranged on each gas inlet line, upstream from and downstream from the gas inlet junction, respectively;
   (e) at least one gas flow controller arranged on the single gas flow control line, such that the plurality of gas flow control lines merge into the single gas flow control line upstream from the at least one gas flow controller, to control pressure at the gas inlet junctions;
   (f) at least one valve for controlling flow of gas in the plurality of gas flow control lines; and
   (g) at least one vacuum pump or exhaust that is fluidly connected to the gas flow control lines, downstream from the gas flow controller.

2. The gas inlet system of claim 1, wherein the first flow restriction and/or the second flow restriction, when provided as a plurality of restrictions, are arranged in a parallel arrangement on the gas inlet line, and wherein the gas inlet line optionally further comprises at least one valve for selectively directing flow through the plurality of restrictions.

3. The gas inlet system of claim 1, wherein the second flow restriction is provided as a plurality of flow restrictions that are arranged in a parallel arrangement.

4. The gas inlet system of claim 1, comprising a first flow restriction and at least one second flow restriction on each of the at least one gas inlet lines, and wherein the restrictions are structured such that the ratio of gas flow through the first and the at least one second flow restriction, for the same pressure difference across both restrictions, is in the range of 1:10 to 10:1.

5. The gas inlet system of claim 1, comprising a first flow restriction and at least one second flow restriction on each of the at least one gas inlet lines, and wherein the restrictions are structured such that the ratio of gas flow through the first and the at least one second flow restriction, at a fixed gas pressure in the gas inlet line is, depending on flow controller settings, in the range of 1:1 to 1000:1.

6. The gas inlet system of claim 1, wherein each of the plurality of gas control lines is fluidly connected to a single gas flow controller.

7. The gas inlet system of claim 1, further comprising at least one flow restriction that is arranged on the gas control line.

8. The gas inlet system of claim 7, wherein the at least one flow restriction is provided as a switchable restriction that is provided as one or more restrictions on separate lines that are arranged in parallel with the gas control line and that connect to the gas control line at a first and a second junction, and wherein at least one valve is further provided for selectively directing gas flow through the one or more restrictions.

9. The gas inlet system of claim 7, wherein the at least one flow restriction is provided on a vent line that is fluidly connected to the at least one gas flow control line, between the at least one valve for controlling gas flow and the gas flow controller.

10. The gas inlet system of claim 9, wherein the vent line is open to atmosphere.

11. The gas inlet system of claim 9, wherein the vent line is connected to a gas reservoir.

12. The gas inlet system of claim 1, wherein the at least one vacuum pump is provided as a single vacuum pump.

13. The gas inlet system of claim 1, wherein the at least one vacuum pump is provided as a plurality of vacuum pumps that are sequentially arranged.

14. The gas inlet system of claim 1, further comprising at least one gas supply.

15. The gas inlet system of claim 14, wherein each of the least one gas supply, when provided as a plurality of gas supplies, is connected to a respective gas inlet line.

16. The gas inlet system of claim 1, wherein the analytical apparatus is a mass spectrometer.

17. The gas inlet system of claim 16, wherein the at least one gas inlet line is fluidly connected to a collision cell of the mass spectrometer.

18. The gas inlet system of claim 16, wherein the vacuum pump connected to the gas control line is part of a vacuum pumping system of the mass spectrometer.

19. An analytical apparatus with a gas inlet system according to claim 1.

20. A method of controlling gas flow into an analytical apparatus operating under vacuum, the method comprising steps of
   flowing gas from at least one gas supply into a plurality of gas inlet lines for providing gas into an analytical apparatus;
   splitting away a portion of the gas flow in each gas inlet line into a respective one of a plurality of gas control lines that is arranged on the gas inlet line and that meets the gas inlet line at a respective gas inlet junction, such that a portion of the gas flow in the gas inlet line flows through the respective gas control line, and wherein gas flow in each gas control line is controlled by means of a gas flow controller that regulates pressure at the gas inlet junction, wherein the plurality of gas control lines merge into a single gas control line upstream of the gas flow controller, and a vacuum pump or exhaust that fluidly connected to the plurality of gas control lines, downstream from the gas flow controller;
   whereby the portion of gas that is not split away from the gas inlet line into the gas control line is delivered into the apparatus and the flow rate into the analytical apparatus is determined by the difference in gas pressure between the gas inlet junction and the analytical apparatus.

21. The method of claim 20, wherein the portion of gas that is split away from the gas inlet line ranges from about 0.0001% to 99.99%.

22. The method of claim 20, further comprising (i) using the gas flow controller to set a first back pressure in the gas control line and thereby a first gas flow rate into the analytical apparatus, followed by (ii) using the gas flow controller to set a second back pressure in the gas control line, different to the first back pressure, and thereby a second gas flow rate into the analytical apparatus, different to the first flow rate.

23. The method of claim 22, wherein at least one of the first and second back pressures is less than 1 bar.

24. The method of claim 22, wherein the first and second flow rates differ by a factor of at least 10.

25. The method of claim 24, wherein the first and second flow rates differ by a factor that is up to up to 100.

26. The method of claim 20, wherein the flow through the gas control line is sufficiently high that no back diffusion into the gas inlet line occurs.

27. The method of claim 20, further comprising controlling flow of gas from the gas supply to the gas inlet junction by means of a first flow restriction and controlling flow of gas from the gas inlet junction into the analytical apparatus by means of at least one second flow restriction.

28. The method of claim 27, wherein the at least one second flow restriction is provided as a plurality of flow restrictions that are arranged in a parallel arrangement.

29. The method of any one of the claim 20, wherein gas from a plurality of gas supplies is flowed into separate gas inlet lines, and wherein the flow of gas in each of the gas inlet lines is controlled by splitting away a portion of the gas flow in each of the gas inlet lines.

30. The method of claim 20, wherein the analytical apparatus is a mass spectrometer.

31. The gas inlet system of claim 1, wherein the gas flow controller is selected from a back pressure regulator, a mass flow controller, or a volume flow controller.

* * * * *

UNITED STATES PATENT AND TRADEMARK OFFICE
CERTIFICATE OF CORRECTION

| | | |
|---|---|---|
| PATENT NO. | : 10,446,377 B2 | Page 1 of 1 |
| APPLICATION NO. | : 15/210507 | |
| DATED | : October 15, 2019 | |
| INVENTOR(S) | : Hans-Juergen Schlueter | |

It is certified that error appears in the above-identified patent and that said Letters Patent is hereby corrected as shown below:

On the Title Page

Should read, 32 Claims

In the Claims

Claim 1, Column 13, Line 65:
Replace "through the a respective gas inlet"
With --through the respective gas inlet--

Claim 29, Column 16, Line 29:
Replace "the method of any one of the claim 20"
With --the method of claim 20--

Signed and Sealed this
Twenty-first Day of April, 2020

Andrei Iancu
*Director of the United States Patent and Trademark Office*